Sept. 13, 1927.
F. L. BUCKNER
HINGE FOR AUTOMOBILE SEATS
Filed Dec. 14, 1926
1,642,226
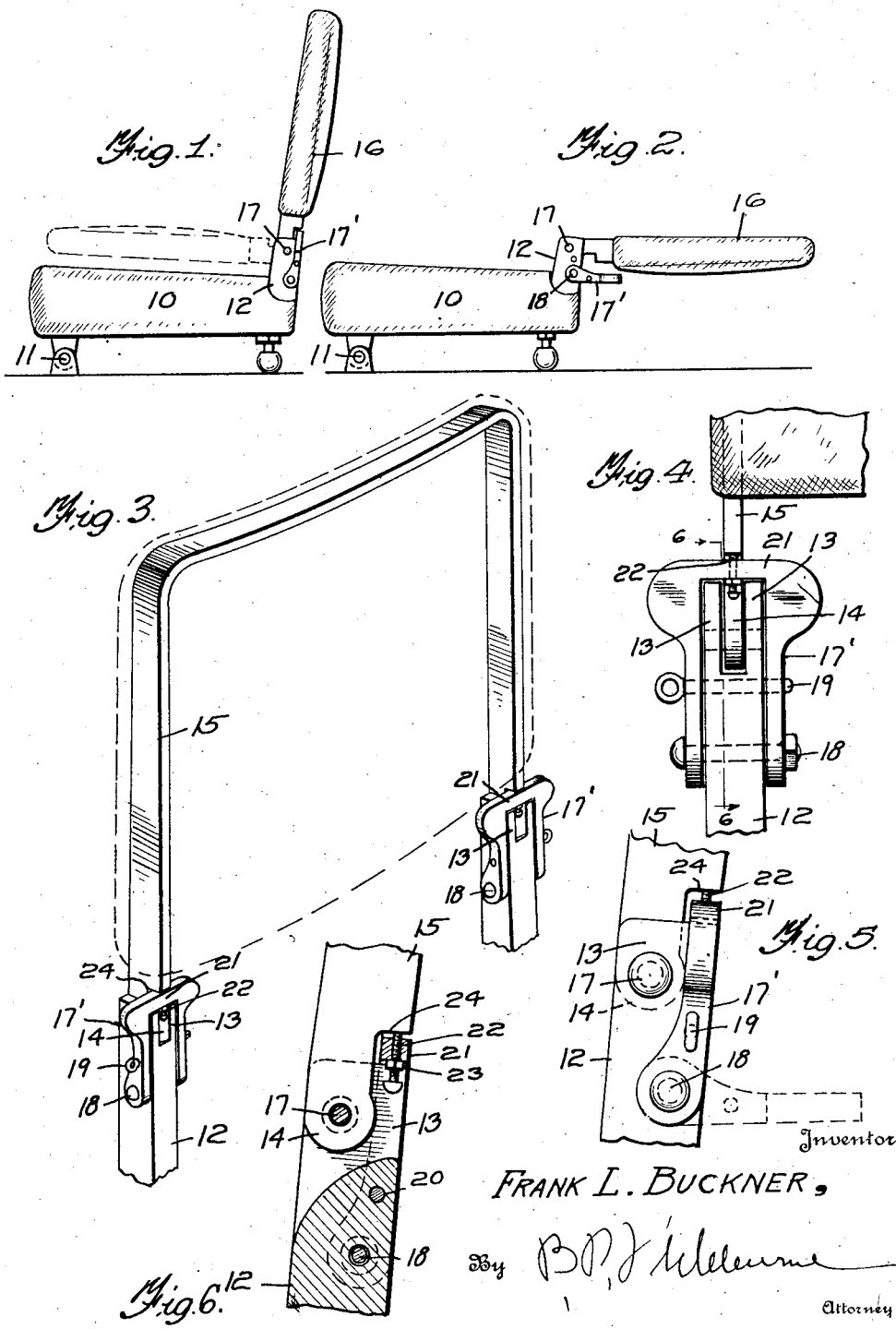
Inventor
FRANK L. BUCKNER,
By
Attorney Patented Sept. 13, 1927.

1,642,226

UNITED STATES PATENT OFFICE.

FRANK L. BUCKNER, OF HANFORD, CALIFORNIA.

HINGE FOR AUTOMOBILE SEATS.

Application filed December 14, 1926. Serial No. 154,744.

My invention relates to a hinge for the back of an automobile seat, such as the front seat in an automobile of the "coach" type.

An important object of the invention is to provide a hinge so constructed that the rearward movement of the back beyond the upright position is normally limited while the back is free to be swung forwardly to a substantially horizontal position, and which may be manipulated so that the back may be swung rearwardly past the upright position, to assume a substantially horizontal position, when it is desired to provide a bed within the automobile.

A further object of the invention is to provide a device of the above mentioned character which is simple in construction, strong and durable.

Other objects and advantages of the invention will be apparent during the course of the following description.

In the accompanying drawings, forming a part of this specification, and in which like numerals are employed to designate like parts throughout the same, Figure 1 is a side elevation of a folding seat embodying my hinge, showing the back element in the elevated position, Figure 2 is a similar view showing the back element swung rearwardly, Figure 3 is a perspective view of the frame of the back element embodying a pair of my improved hinges, Figure 4 is a side elevation of a hinge embodying my invention, Figure 5 is an edge elevation of the same, and, Figure 6 is a longitudinal section taken on line 6—6 of Figure 4.

In the drawings, wherein for the purpose of illustration, is shown a preferred embodiment of my invention, the numeral 10 designates the bottom element of a folding seat of an automobile, of the "coach" type. This seat is arranged in the front of the body of the automobile and is hinged at 11 to swing vertically forwardly, as is well known.

The frame of the seat element 10 embodies upstanding posts or leaves 12 arranged at the rear corners of the same. These leaves are forked at their upper ends providing knuckles 13, for receiving therebetween, knuckles 14, formed upon the ends of the leaves included in an inverted U-shaped frame 15, included in the back element 16, of the seat. The knuckles 14 are pivoted to the knuckles 13 by means of pintles 17, as shown. The back element 16 is free to be swung forwardly to a horizontal position, so that it may lie substantially flat upon the seat element 10, as indicated in Figure 1.

Means are provided to limit the rearward swinging movement of the back element 16 beyond the upright position, and this means includes lock-yokes 17', which are inverted U-shaped. These lock-yokes are arranged over the tops of the leaves 12, adjacent to the rear sides thereof, and are pivoted to the leaves, adjacent to the lower ends of the lock-yokes, by means of bolts 18 or the like. Each lock-yoke is retained in the closed position by means of a pin 19 or the like, passing through openings in the sides of the lock-yoke and in the leaves 12, as shown at 20, in Figure 6. The transverse upper end 21 of the lock-yoke carries an adjustable stop bolt 22, having screw-threaded engagement therewith, and adapted to be held in the adjusted position by a lock nut 23. The leaf included in the frame 15 is provided at its lower end, and at its rear side, with a notch, providing a shoulder 24, to contact with the end of the stop bolt element 22. The transverse end 21 of the lock-yoke fits within the notch, as shown.

In view of the foregoing description, it is obvious that at all times the seat element 16 is free to be swung forwardly to the horizontal position. Ordinarily it is desired to prevent the back element 16 from swinging rearwardly beyond the upright position, and when the lock-yokes are held in the closed position by the pins 19, the back element can not be swung rearwardly beyond this limit. By removing the pin 19, each lock-yoke may be swung rearwardly to a horizontal position, Figure 5, so that the stop bolt 22 will be brought out of the path of travel of the shoulder 24, and the frame 15 may then be swung rearwardly to a horizontal position.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:—

1. A hinge for the back element of an automobile seat or the like, comprising a relatively stationary leaf, a swinging leaf pivoted to the stationary leaf below the upper end of the stationary leaf and projecting above the same and having a transverse shoulder arranged above the stationary leaf, a lock-yoke pivoted to the stationary leaf below the first named pivot and having a transverse part adapted to be arranged above the upper end of the stationary leaf and below the transverse shoulder, and an adjustable stop element carried by the transverse part and adapted to engage the transverse shoulder.

2. A hinge for the back element of an automobile seat, comprising a substantially vertical post having its upper end forked providing spaced knuckles, an upper bar pivoted between said spaced knuckles and adapted to be arranged at substantially a straight angle with relation to the post to project above the same, said bar having a shoulder arranged above the upper ends of said knuckles, and an inverted U-shaped lock yoke pivoted to said post and adapted to straddle the same with its transverse portion above the upper ends of said knuckles, said inverted substantially U-shaped yoke being adapted to be arranged parallel with said post with its transverse portion co-acting with the shoulder of said bar.

3. A hinge for the back element of an automobile seat, comprising a lower substantially vertical post having its upper end forked to provide spaced apertured knuckles, said post having a transverse aperture beneath the apertures of the knuckles, a bar having its lower end apertured and adapted for insertion between the apertured knuckles, a pivot element passing through the apertures of the knuckle and bar to pivotally connect the same, said bar being adapted to be arranged at a straight angle with relation to the post and to project above the same, said bar having a shoulder adapted to be arranged above the upper ends of the apertured knuckles, an inverted U-shaped lock yoke adapted to straddle the upper end of said post and having its lower end pivotally connected with said post at a point beneath the transverse aperture of the post, said yoke having sides provided with apertures and a transverse part, said transverse part being adapted to be arranged above the upper ends of said knuckles to co-act with the shoulder of the bar, and a pin adapted to be passed through the apertures in the sides of the yoke and the aperture in said post to hold the yoke against swinging movement.

4. A hinge for the back element of an automobile seat, comprising a substantially vertical post, a bar pivotally connected with the upper end of the post and adapted to assume a substantially straight angle with relation thereto while projecting above the same, said bar having a shoulder arranged above the top of the post, and a lock member pivoted upon the post and provided with a part adapted to be shifted over the top of the post and beneath said shoulder, for co-action therewith, said post, lock member and bar when in the locked relation, being generally parallel for providing a compact structure.

In testimony whereof I affix my signature.

FRANK L. BUCKNER.